United States Patent [19]

Livesay

[11] 4,239,297
[45] Dec. 16, 1980

[54] RADIAL FACE SEAL

[75] Inventor: Richard E. Livesay, Peoria, Ill.

[73] Assignee: Caterpillar Tractor Co., Peoria, Ill.

[21] Appl. No.: 969,028

[22] Filed: Dec. 13, 1978

[51] Int. Cl.³ .................. B62D 55/20; F16J 15/36
[52] U.S. Cl. .................................... 305/11; 277/95;
   277/145; 277/165; 305/14
[58] Field of Search .............. 277/95, 144, 145, 152,
   277/165; 305/11, 14

[56] References Cited

U.S. PATENT DOCUMENTS

| 3,379,480 | 4/1968 | Storm | 305/11 |
| 3,480,338 | 11/1969 | Durham et al. | 305/11 |
| 3,525,530 | 8/1970 | Bauer et al. | 277/165 |
| 3,801,163 | 4/1974 | Khuntia | 305/11 |

FOREIGN PATENT DOCUMENTS

| 559124 | 10/1930 | Fed. Rep. of Germany | 305/14 |
| 851630 | 8/1952 | Fed. Rep. of Germany | 277/95 |
| 259649 | 11/1968 | U.S.S.R. | 305/11 |

*Primary Examiner*—David A. Scherbel
*Attorney, Agent, or Firm*—Wegner, Stellman, McCord, Wiles & Wood

[57] ABSTRACT

A seal (58) is provided between two piece parts (14,18) on each side of a track joint of a track chain (10). An inner cylindrically-shaped sealing ring (60) having an inwardly flared lip (62) is pressed into a slot (72) in one piece part (14) and is sealingly engaged by an overlapping outer cylindrically-shaped sealing ring (64) having an outwardly flared lip (66) pressed into a slot (74) in the facing surface of the other piece part (18). The sealing rings (60,64) are concentric, thin walled case hardened steel and engage along an interface at an angle of approximately five degrees. The piece parts (14,18) inside the oil cavity may be machined to act as thrust faces (48,54).

12 Claims, 4 Drawing Figures

RADIAL FACE SEAL

DESCRIPTION

1. Technical Field

This invention relates to seals and, more particularly, to a lubricant seal for relatively movable parts of a track chain.

2. Background Art

Track roller chains for track-type vehicles are exposed to extreme temperature and environmental conditions as well as heavy loads and hard wear. Throughout exposure to all of these conditions, the seals for maintaining lubricant in the proper location and for keeping the lubricant clean must be unfailing.

U.S. Pat. No. 3,180,648 to B. F. Kupfert et al, issued Apr. 27, 1965, provides a seal between relatively rotating parts using two rings of metal or other hard material. The mating surfaces of the rings are ground and lapped in a particular way so that pressure on the parts will create a desirable contact between portions of the rings effecting a seal. The seal is very effective and long lasting, but the machining of the surfaces is expensive.

U.S. Pat. No. 3,390,922 to H. L. Reinsma, issued July 2, 1968, provides a seal between relatively rotatable parts of a track joint wherein a seal member is nested in a recess formed in one of the piece parts. The recess is relatively small radially so that the piece parts have substantially large thrust bearing surfaces. Sealing rings of different configurations are provided in the recess for effecting the seal. The shapes and configurations of the sealing rings may require relatively large space for assembly, may be relatively expensive, and may be somewhat complicated to manufacture and install.

U.S. Pat. No. 3,841,718 to H. L. Reinsma, issued Oct. 15, 1974, shows a track link seal having a thrust ring, a load ring, and a seal ring bearing between the piece parts. The assembly requires a relatively large space to include the three parts in the assembly.

DISCLOSURE OF INVENTION

In one aspect of the present invention, a seal is provided between two relatively rotatable parts of a track link. The parts of the link have a recess formed axially therein with a cylindrically-shaped sealing ring seated in each of said recesses. In one embodiment, an inwardly flared lip on the distal end of one of said sealing rings engages in sealing relationship with an outwardly flared lip on the distal end of the other of said sealing rings.

Newly designed track link assemblies require smaller cross section seals and a life expectancy of two to three times longer than previous seal life. The small cross section and longer life must be accomplished with little or no increase in cost.

The improved radial seal design accomplishes all of the objectives. The cross sections of the recesses in the mating piece parts are considerably reduced over the size of the recesses in existing seals including the seals in the two Reinsma U.S. Pat. Nos. 3,841,718 and 3,390,922 discussed above. The life cycle of the improved radial seals is more than double previous designs using non-metallic materials and the cost of the new radial seals is within an acceptable range so that all objectives are met.

BEST MODE FOR CARRYING OUT THE INVENTION

Figure 1:
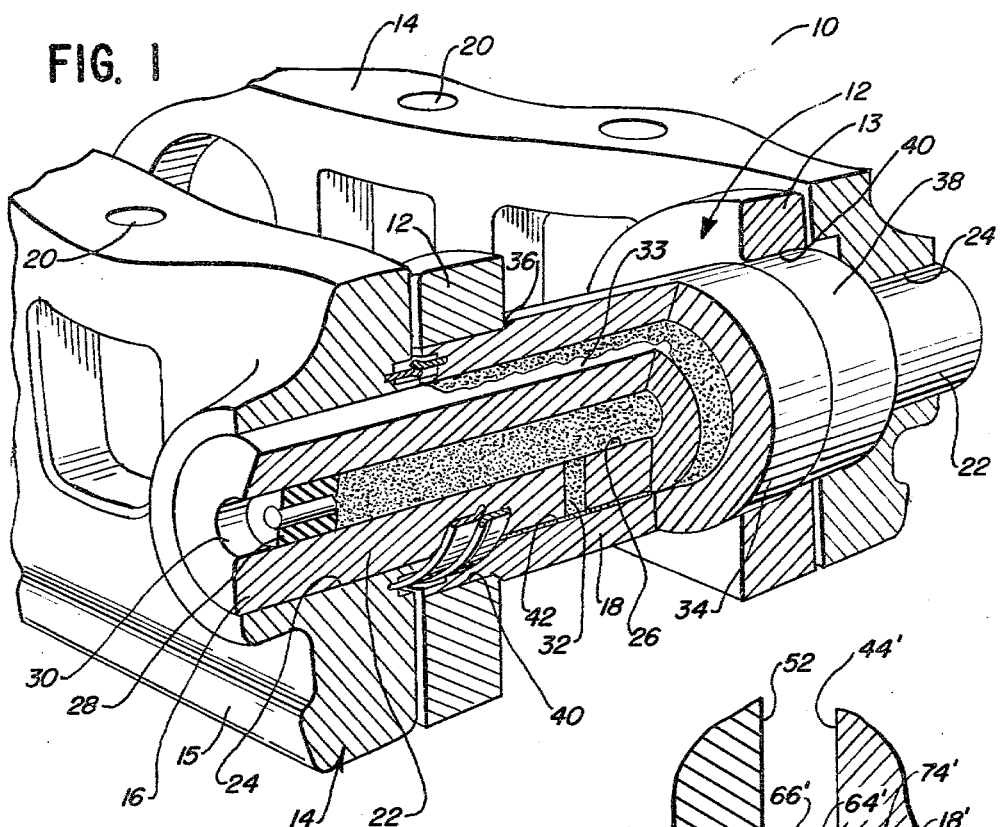
FIG. 1 is a perspective view partially in cross section of a joint between adjacent links of a track chain showing the improved radial seal structure.

A track chain 10 includes a plurality of interconnected links 12,14, only the trailing end portion 13 of link 12 and the leading end portion 15 of link 14 being shown in FIG. 1. The overlapping end portions 13 and 15 of adjoining links 12 and 14 are pivotally connected together by a track pin 16 and bushing 18 connection. Track shoes, not shown, are bolted to the links 12 and 14 by passing bolts through the shoes and into the openings 20 in the links.

The track pin 16 has its end portions 22 press fit in the bores 24 in the outer or leading ends 15 of links 14 and has an oil reservoir 26 on the inside thereof. The outer end of the track pin 16 has an end plug 28 nested in the opening 30 in the reservoir 26 to seal lubricant in the reservoir. The reservoir 26 has a radial passage 32 for feeding lubricant out of the reservoir and onto the outer surface 33 of the track pin 16.

The bushing 18 has a raised or enlarged mid-portion 34 which provides outwardly facing shoulders 36. The shoulders 36 serve to space the inner or trailing ends 13 of links 12 when the bushing 18 is in position around the track pin 16 and has the surfaces 38 press fit in bores 40 in said links 12. The inner bore 42 of the bushing 18 rotates with respect to the outer surface 33 of the track pin 16 when the links 12 rotate relative to the links 14 as when the chain 10 traverses around a sprocket or the like.

Figure 2:
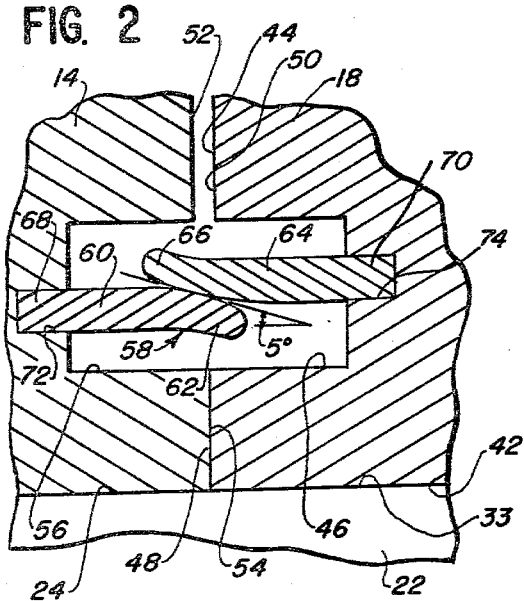
FIG. 2 is an enlarged cross-sectional view taken through the improved radial seal structure of FIG. 1.
Figure 3:
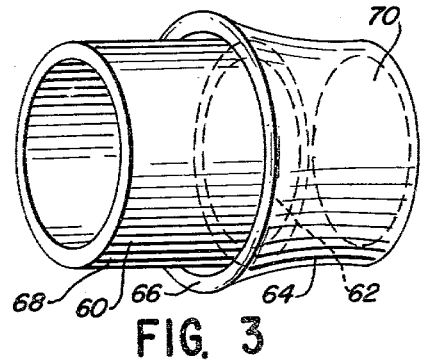
FIG. 3 is a perspective view of the two parts of the improved radial seal in sealing contact.

As shown in FIG. 2, each axially directed end face 44 of the bushing 18 has a groove or recess 46 formed axially inward therefrom with said recess 46 being radially spaced outward from the inner bore 42 of the bushing 18. The area between the bores 42 and the recess 46 forms an axially facing thrust bearing surface 48. It will be noted in FIG. 2, in exaggerated form, that the axial surface 50 of the bushing 18, between the groove or recess 46 and the surface 38 of the bushing 18, is axially cut or ground away slightly so as to provide a spacing relative to the axially directed end face 52 on the link 14. The end face 52 has an axially facing, inwardly disposed groove or recess 56 formed in said link 14 which recess 56 aligns with the recess 46 in the bushing 18. An axially facing bearing surface 54 is formed on said link 14 between said recess 56 and said bore 24. The bearing surface 54 on link 14 is adapted to contact bearing surface 48 on the bushing 18 to provide a thrust bearing support therebetween.

During use, the lubricant from reservoir 26 flows out the passage 32 to lubricate the surface 33 and bore 42 between pin 16 and bushing 18. The lubricant will also flow outward between the thrust bearing surfaces 48 and 54 between the ends of bushing 18 and the links 14.

To seal the lubricant in and to prevent ingress of contaminants from without, improved radial seals 58 are provided and include an inner cylindrically-shaped sealing ring 60 having a distal end portion 62 which may be inwardly turned or flared and an outer cylindrically-shaped sealing ring 64 having a distal end portion 66 which may be outwardly turned or flared. The ring 60 has an end portion 68 opposite the distal end portion 62 seated in a circular slot 72 formed in the base of the recess 56 in the link 14. The ring 64 has an end portion 70 opposite the distal end portion 66 which portion 70 is seated in a circular slot 74 formed in the base of the recess 46 in bushing 18. The fit of the rings 60,64 in the slots 72,74 is an interference fit. Each ring 60,64 due to its mounting in the slots 72,74, has a cantilever-type extension from the bases of the recesses 56,46 and has the end portions 62,66 extending beyond the planes containing the surfaces 54,48, respectively. The rings 60,64 are concentrically mounted relative to each other. The rings 60, 64 are thin walled cylinders which may be made of case hardened steel or other metal or hard plastic material. The outside diameter of the inner ring 60 is larger than the inside diameter of the outer ring 64 which, when combined with the flaring of the end portions 62, 66 of said rings 60,64 and with the concentric mounting of the rings 60,64, will cause the inside of flared end portion 66 of ring 64 to contact the outside flared end portion 62 or ring 60 in a sealing relationship as the surfaces 48,54 take the thrust load between the bushing 18 and the link 14. The contact surface or interference between the two rings 60,64 is at an angle of approximately five degrees to the horizontal axis of the rings.

Figure 4:
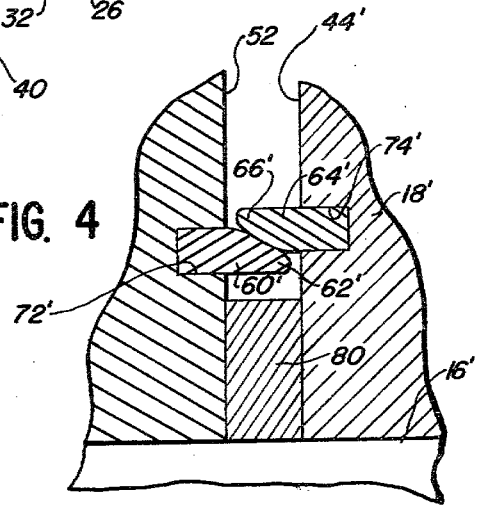
FIG. 4 is a cross-sectional view similar to FIG. 3 only showing a modified form of the invention.

A modified form of invention is shown in FIG. 4 wherein the facing surface 52' of the links 14 are spaced from the facing surfaces 44' of the bushing 18'. A thrust ring 80 is positioned between said facing surfaces 52',44' to provide thrust bearing support between the links 14' and the bushing 18'. A ring 60' is seated by an interference fit in a circular slot 72' in the link 14'. A ring 64' is seated by an interference fit in a circular slot 74' in the bushing 18'. The distal end portions 62' and 66' of the rings 60' and 64' contact each other with a line contact, as described above with respect to rings 60,64, as the thrust ring 80 takes the thrust loads between the bushing 18' and the links 14'.

INDUSTRIAL APPLICABILITY

At each joint in a track chain 10, the inside or trailing ends 13 of a pair of links 12 are pressed on the surfaces 38 of the bushing 18. The flared rings 64 project axially outward from the recesses 46 on the ends of said bushing 18. The pin 16 is passed through the bore 42 in the bushing 18 whereupon the leading ends 15 of the links 14 are pressed on the end portions of the pin 16 with the flared rings 60 projecting axially outward from the recess 56 in said links 14. As the links 14 are assembled on the pin 16, the rings 60 will telescope in the rings 64 on the bushing 18 to establish a line contact between said rings 60,64 as the surfaces 54 on the link 14 contact mating surfaces 48 on the bushing 18. Lubricant in the reservoir 26 will flow out passage 32 to lubricate the relatively rotating surface 33 on pin 16 and the surface of the bore 42 in the bushing 18. Lubricant will also flow between the mating thrust bearing surfaces 48,54. It is to be understood that the inwardly flared rings 60 could be located on the ends of the bushing 18 and the outwardly flared rings 64 could be located on the links 14 without departing from the invention.

In the modification shown in FIG. 4, the rings 60',64' are mounted in slots 72',74' and the thrust ring 80 takes the thrust loading between the bushing 18' and the links 14'.

In one operative embodiment of the invention, end motion at the joint of ±0.020 inches was present and a five degree angle of contact between rings 60 and 64 was set. A diametral interference of 0.040 inches generated 200,000 psi stress in 0.080 inch thick rings 60,64 having a 2.880 inch inside diameter. Such a seal would fit a 2.250 inch diameter pin having a seal recess opening of 25 inches square. The sealing load pressure (face load) was 11,000 psi.

Seals made according to the invention fit in recesses approximately one half the size of conventional recesses of the type shown in the two Reinsma U.S. Pat. Nos. 3,390,922 and 3,841,718. The improved seal has a life span of 10,000 hours which is two or three times conventional life spans. The improved seal is relatively inexpensive to manufacture and reduces the number of parts needed for a seal.

I claim:

1. A seal (58) between two relatively rotatable piece parts (14,18), a cylindrically-shaped sealing ring (60) seated in a slot (72) in a facing surface (52) of one of said piece parts (14), a second cylindrically-shaped sealing ring (64) seated in a slot (74) in a facing surface (44) of the other of said piece parts (18), an inwardly flared lip (62) on the distal end of one of said sealing rings (60,64), an outwardly flared lip (66) on the distal end of the other of said sealing rings (60,64), and said outwardly flared lip (66) on said one sealing ring (60,64) sealingly engaging the inwardly flared lip (62) on said other sealing ring (60,64).

2. A seal as claimed in claim 1 wherein said piece parts (14,18) on the inside of said seal have axially facing surfaces (48,54) in contact with each other in thrust loading relationship.

3. A seal as claimed in claim 1 wherein a thrust ring (80) is positioned between said facing surfaces (44,52) of the piece parts (14,18) for receiving thrust loads between said piece parts (14,18).

4. A seal as claimed in claim 1 wherein said inwardly flared lip (62) engages with said outwardly flared lip (66) along a line that forms an angle of approximately five degrees with the axis of the sealing rings (60,64).

5. A seal as claimed in claim 1 wherein said sealing rings (60,64) are made of case hardened steel.

6. A seal (58) between two relatively rotatable piece parts (14,18), each piece part (14,18) has a recess (46,56), a slot (72,74) formed in the base of each recess, a first cylindrically-shaped sealing ring (60) seated in one of said slots (72) in a facing surface (44) of one of said piece parts (14), a second cylindrically-shaped sealing ring (64) seated in the other of said slots (74) in a facing surface (52) of the other of said piece parts (18), an inwardly flared lip (62) on the distal end of one of said sealing rings (60,64), an outwardly flared lip (66) on the distal end of the other of said sealing rings (60,64), and said outwardly flared lip (66) on said other sealing ring (64) sealingly engaging the inwardly flared lip (62) on the first-named sealing ring (60).

7. A seal (58) between two relatively rotatable piece parts (14,18) for retaining lubricant on one side of said seal (58), a concentric slot (72,74) formed in facing surfaces of said piece parts, an inner cylindrically-shaped sealing ring (60) seated in the slot (72) in one of said piece parts (14,18), an inwardly flared lip (62) on the distal end of said inner sealing ring (60), an outer cylindrically-shaped sealing ring (64) seated in the slot

(74) in the other of said piece parts (14,18), an outwardly flared lip (66) on the distal end of said outer sealing ring (64), said outwardly flared lip (66) on said outer sealing ring (64) sealingly engaging the inwardly flared lip (62) on the inner sealing ring (60), and said piece parts (14,18) on the inside of said seal having thrust loading relationship therebetween whereby lubricant is retained on the inside of said seal (58) and in lubricating relationship with said thrust loaded parts.

8. A seal as claimed in claim 7 wherein said inwardly flared lip (62) engages with said outwardly flared lip (66) along a line that forms an angle of approximately five degrees with the horizontal axis of the sealing rings (60,64).

9. A seal as claimed in claim 7 wherein said piece parts (14,18) on the inside of said seal have axially facing surfaces (48,54) in contact with each other in thrust loading relationship.

10. A seal as claimed in claim 7 wherein a thrust ring (80) is positioned between said facing surfaces (44,52) of the piece parts (14,18) for receiving thrust loads between said piece parts (14,18).

11. A seal (58) between two relatively rotatable piece parts (14,18) for retaining lubricant on one side of said seal (58), each piece part having a recess (46,56) formed therein, a concentric slot (72,74) formed in facing surfaces of said recesses (46,56), an inner cylindrically-shaped sealing ring (60) seated in the slot (72) in one of said piece parts (14,18), an inwardly flared lip (62) on the distal end of said inner sealing ring (60), an outer cylindrically-shaped sealing ring (64) seated in the slot (74) in the other of said piece parts (14,18), an outwardly flared lip (66) on the distal end of said outer sealing ring (64), said outwardly flared lip (66) on said outer sealing ring (64) sealingly engaging the inwardly flared lip (62) on the inner sealing ring (60), and said piece parts (14,18) on the inside of said seal having thrust loading relationship therebetween whereby lubricant is retained on the inside of said seal (58) and in lubricating relationship with said thrust loaded parts.

12. A seal (58) between a bushing (18) and a link (14) of a track link for retaining lubricant on one side of said seal, a concentric slot (72,74) formed in facing surfaces (44,52) of said bushing (18) and said link (14), an inner cylindrically-shaped sealing ring (60) seated in the slot (72) in said link (14), an inwardly flared lip (62) on the distal end of said inner sealing ring (60), an outer cylindrically-shaped sealing ring (64) seated in the slot (74) in said bushing (18), an outwardly flared lip (66) on the distal end of said outer sealing ring (64), said outwardly flared lip (66) on said outer sealing ring (64) sealingly engaging the inwardly flared lip (62) on the inner sealing ring (60), and said bushing (18) and link (14) on the inside of said seal having axially facing surfaces (48,54) in contact with each other in a thrust loading relationship whereby lubricant is retained on the inside of said seal and in lubricating relationship with said contacted surfaces of the piece parts.

* * * * *